United States Patent
Kamioka et al.

[11] Patent Number: 5,831,951
[45] Date of Patent: Nov. 3, 1998

[54] METHOD AND APPARATUS FOR CONTROLLING A SLICE SIGNAL IN THE REPRODUCTION INFORMATION RECORDED IN AN OPTICAL DISK

[75] Inventors: Yuichi Kamioka, Katano; Shigeru Furumiya, Himeji; Yuji Hisakado, Osaka, all of Japan

[73] Assignee: Matsushita Electric Industrial Co., Ltd., Osaka-fu, Japan

[21] Appl. No.: 831,944

[22] Filed: Apr. 2, 1997

[30] Foreign Application Priority Data

Apr. 3, 1996 [JP] Japan ................................ 8-081262

[51] Int. Cl.$^6$ ................................ G11B 5/09
[52] U.S. Cl. ................................ 369/48; 369/59
[58] Field of Search .................. 369/44.25, 44.32, 369/54, 47, 48, 124, 44.26, 49, 59; 360/32

[56] References Cited

FOREIGN PATENT DOCUMENTS

| 0 051 343 | 5/1982 | European Pat. Off. . |
| 0 653 753 | 5/1995 | European Pat. Off. . |
| 62-112230 | 5/1987 | Japan . |
| 2-187926 | 7/1990 | Japan . |
| 5-40978 | 2/1993 | Japan . |
| 5-128624 | 5/1993 | Japan . |

*Primary Examiner*—Paul W. Huber
*Attorney, Agent, or Firm*—Wenderoth, Lind & Ponack, L.L.P.

[57] ABSTRACT

When information is reproduced from an optical disk, a comparator compares a reproduced signal with a slice signal to generate binarized signals, while the slice signal is corrected continuously for external disturbances in a reproduced signal. A switch changes the time constant of the frequency response of the slice signal according to the reproduced signal. For example, the frequency response of the slice signal is set faster in a first region in a prepit area of the disk and in a record area of the disk so that the slice level converges quickly, while the frequency response is changed thereafter to a low time constant for normal signals. Thus, inaccuracy in binarization of the reproduced image signal is minimized, and the sector format is performed efficiently.

14 Claims, 15 Drawing Sheets

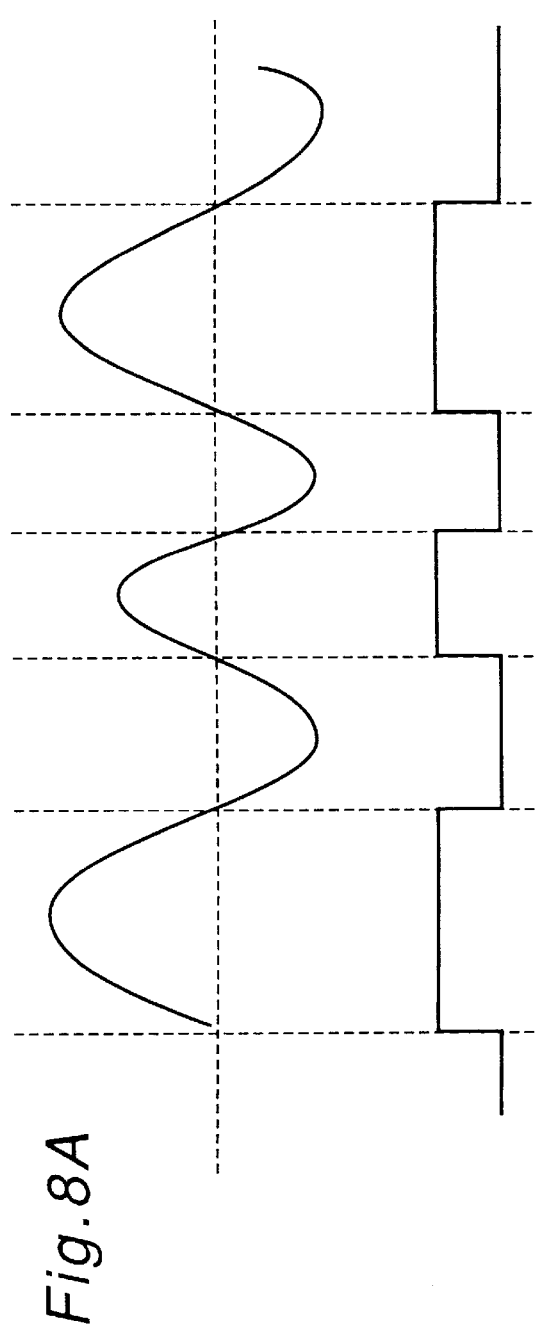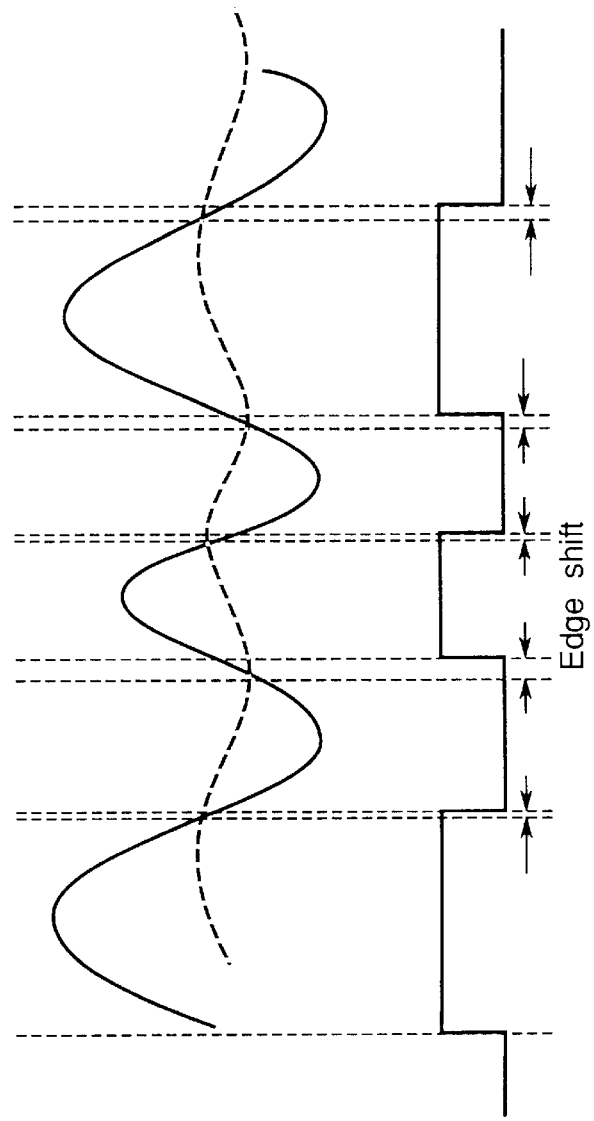

METHOD AND APPARATUS FOR CONTROLLING A SLICE SIGNAL IN THE REPRODUCTION INFORMATION RECORDED IN AN OPTICAL DISK

BACKGROUND OF THE INVENTION

1. Field Of The Invention

The present invention relates to an apparatus and an method for reproducing signals of a optical disk, and in particular to a binarization apparatus and a method for converting an analog signal reproduced with a pickup to a digital signal.

2. Description Of Prior Art

When data of an optical disk of recorded bit information is reproduced, binarization is performed with a slice signal of fixed voltage level. Then, digital data obtained by the binarization may have an edge shift, and when the reproduced signal has envelope variation, amplitude variation or asymmetry of amplitude, correct reproduction becomes impossible. When such edge shift occurs, the data does not yield pertinent binarization for reproducing mark edge data wherein reproduced pit lengths represent information.

Therefore, a control method is proposed to keep the slice signal always at the most appropriate level even for such reproduced signals by adapting to amplitude variation and asymmetry of the reproduced signal. For example, Japanese Patent laid open Publication 5-128,624/1993 shows feed forward control which detects a peak level and a bottom level of a reproduction envelope to output the middle point thereof to the binarization circuit as the slice signal. Further, a feedback control of the slice signal is also proposed so that a difference (DSV) of numbers of "1" and "0" of digital data obtained by the binarization becomes zero when the direct current component of binarized codes is zero theoretically.

Among the factors which cause envelope variation, amplitude variation and amplitude asymmetry of reproduced signals, deterioration of record film caused by repetitive recording, sensitivity difference of record film and variation of defocus and off-track and the like frequency have components of a few tens of kHz or lower.

When amplitude variation does not occur in reproduced signals, edge shift of digital signals after binarization becomes minimum by using a slice signal of a fixed voltage. However, when amplitude variation of reproduced signals occurs and the slice signal follows the amplitude variation, a frequency of about a few tens of kHz is the most appropriate for the frequency response for the envelope variation, and amplitude variation mentioned above. If the frequency response becomes faster, the slice signal tends to follow the code itself, and the phase delay of the slice signal in response to the reproduced signal enhances the edge shift of the data obtained by the binarization with the slice signal.

However, in an optical disk wherein data are recorded in the unit of sector, there is a difference in reflectance between a prepit area wherein prepits are formed in a mirror plane and a record area having a land track or a groove track, and this makes the voltage level of reproduced signals discontinuous at the boundary when signals are reproduced. Further, when prepit signals are arranged in an optical disk with wobbling at an inner side and at an outer side by a half track from a record track, pits are reproduced with a laser beam offset by a half track. Then, in order to increase the signal-to-noise ratio of the reproduced signals, it is preferable to detect a difference signal in the tracking direction than to detect a sum signal in the normal signal reproduction with a technique similar to tracking offset detection. However, when data arranged with wobbling is detected as a difference signal, the positive and negative polarities of the reproduced signal are changed alternately with a center of reference voltage, and reproduced signals have discontinuous voltage levels. Therefore, if the pick up passes the boundary with low frequency response of about ten kHz of the slice signal, the slice signal cannot respond at the start of the record area, and it takes an amount of time until the slice signal converges to a level appropriate for binarization. Thus, format efficiency becomes low.

SUMMARY OF THE INVENTION

An object of the present invention is to provide a method and an apparatus for binarization which generates an appropriate slice signal for reproducing information in an optical disk.

In one aspect of the invention for reproducing information recorded in an optical disk, a pickup reproduces an analog signal from an optical disk wherein the reproduced analog signal includes discontinuities generated at boundaries between different areas along a track. A slice signal controller corrects a slice signal for external disturbances continuously based on the analog signal, and a comparator binarizes the analog signal with the slice signal and generates binarized signals. A changer changes the frequency response of the slice signal in correspondence to a discontinuity included in the analog signal. The changer comprises, for example, a timing generator for generating a timing signal, which indicates a time at which to change the frequency response of the slice signal in correspondence to a discontinuity in the analog signal, and a switch which changes the frequency response according to the timing signal received from the timing generator. For example, the frequency response is changed to a high speed response at a discontinuity in reflectance such as boundaries between a mirror plane and a land area or in an area with no effective data so as to the slice signal to converge quickly to the center of the amplitude of reproduced signal. Then, the frequency response is changed to a low speed response by using the converged value at the initial value, for example, when a predetermined time passes after the discontinuous signal is detected. Such control on the frequency response for the slice signal keeps edge shifts of the binarized data small and prevents a decrease in format efficiency even when an amplitude variation of the reproduced signal or the like happens.

In an example, for an analog signal from an optical disk having a sector format with a prepit area including a variable frequency oscillator (VFO) area before a data area, the changer changes the frequency response of the slice signal so that the slice signal has a first frequency response in a first region in the VFO area from a starting point thereof and a second frequency response having a slower frequency response than the first frequency response in a second region following the first region in the VFO area and in the data area in the prepit area.

In a different example, for an optical disk having a sector format which comprises a record area and a prepit area having pits wobbled by a half track to an inward direction and to an outward direction thereof, a selector selects a sum signal in a tracking direction in a prepit area or a difference signal in the tracking direction in a record area. The sum signal or the difference signal are compared as the analog signal with the slice signal. The changer changes the frequency response of the slice signal to a first frequency response in a first region after a discontinuous signal in the analog signal and to a second frequency response slower than the first frequency response in a second region following the first region.

In a different aspect of the invention, for an optical disk having a sector format with a prepit area and a record area, the changer changes the frequency response at a start point of a prepit area and at a, start point of a second region in a record area, the second region following a first region in the record area following the prepit area.

In a further aspect of the invention, for an optical disk of constant linear velocity (CLV) control, the changer comprises a detector detecting a revolution number of the optical disk and provides a difference of the revolution number detected by the detector from a normal revolution number and changes the frequency response of the slice signal according to the difference of the revolution number. Though the revolution number of the optical disk does not reach a predetermined value just after the pick up performs a track jump or seek, data reproduction becomes sure i.e., reliable, just after a track jump or seek by adjusting the frequency response of the slice signal by the changer.

An advantage of the present invention is that an appropriate slice level can be generated for reproducing the date of an optical disk.

BRIEF DESCRIPTION OF THE DRAWINGS

These and other objects and features of the present invention will become clear from the following description taken in conjunction with the preferred embodiments thereof with reference to the accompanying drawings, in which:

FIG. 8A is a diagram of the slice signal which responds normally to the reproduced signal, and FIG. 8B is a diagram of the slice signal which overresponds to the reproduced signal;

DETAILED DESCRIPTION OF THE PREFERRED EMBODIMENTS

Figure 1:
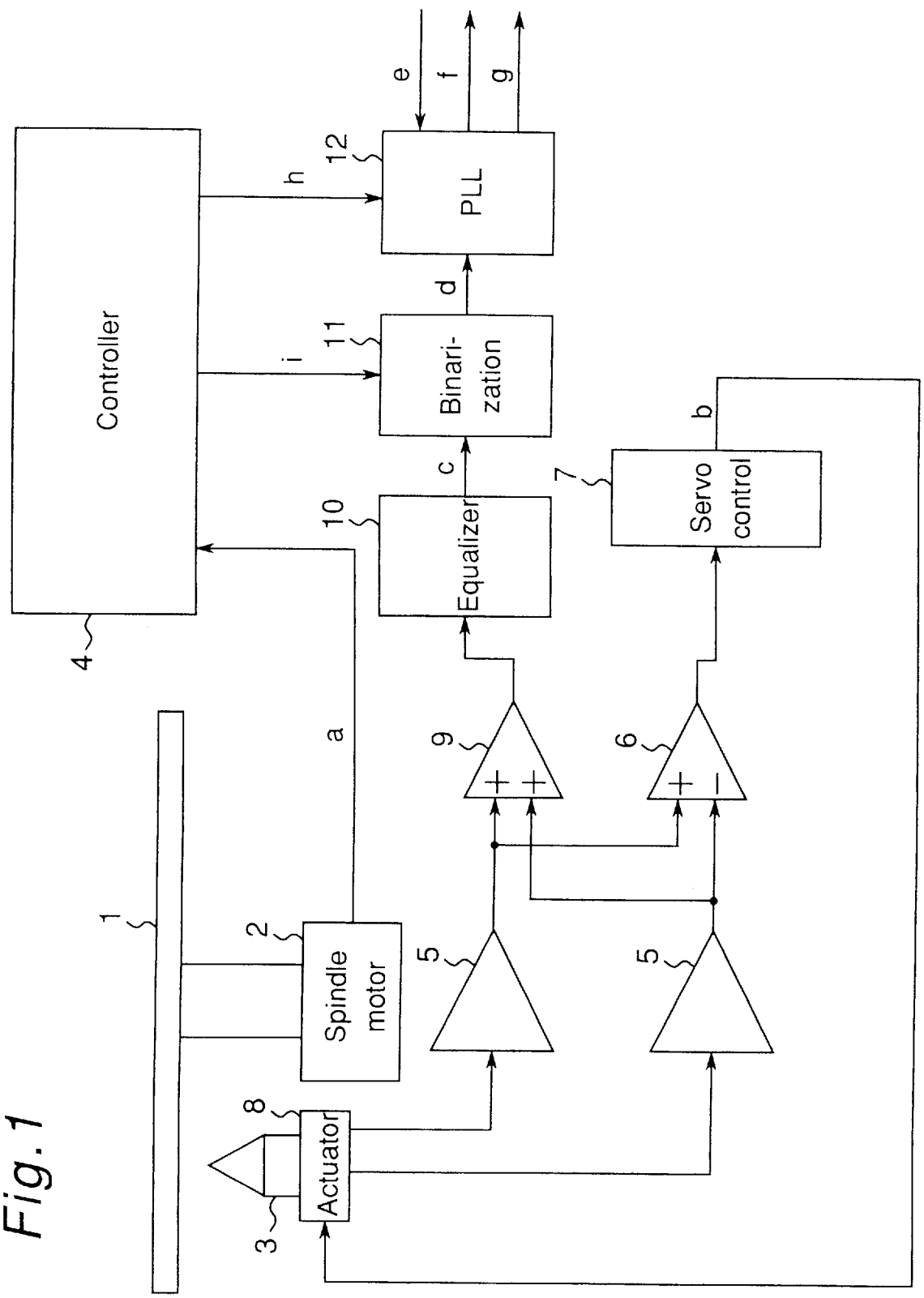
FIG. 1 is a block diagram of a reproduction system for an optical disk.

Referring now to the drawings, wherein like reference characters designate like or corresponding parts throughout the several views, FIG. 1 is a schematic diagram of a system wherein the rotation of an optical disk 1 is controlled by a spindle motor 2 so that the linear velocity observed from a pickup 3 becomes constant. The spindle motor 2 outputs revolution number information "a" to a control block 4. The revolution number information "a" may also be detected by reproducing a predetermined pattern recorded on the disk and detecting a pattern length from the reproduced patterns.

A reproduced signal from the optical disk 1 is amplified by a head amplifier 5, and an error signal "b" obtained by a differential amplifier 6 is output through a servo control block 7 to an actuator 8. Thus, the focusing and location of the optical pickup 3 is controlled.

On the other hand, a reproduced signal received by the preamplifier 9 is equalized on waveform by an equalizer block 10 to be output to a binarization block as signal "c".

The signal "c" is converted by the binarization block 11 to digital signal "d". A phase-locked-loop (PLL) block 12 outputs reproduced data "f" and a reproduction clock signal "g" based on a received converted digital signal "d" and a received external standard clock signals "e". The control line "h" carries a start signal for the phase-locked loop.

Figure 2:
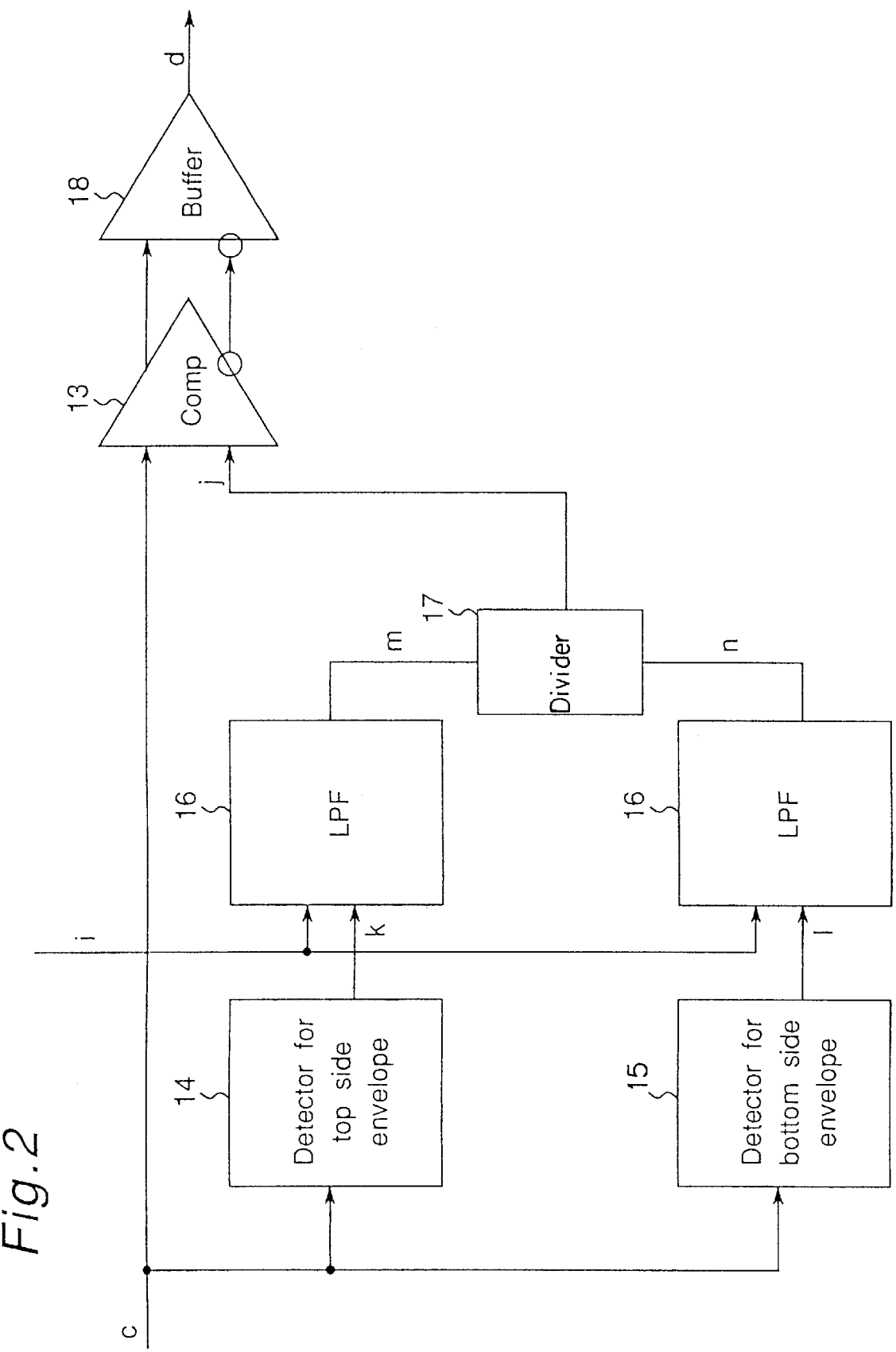
FIG. 2 is a block diagram of a binarization block.

FIG. 2 is a detailed block diagram of an example of the binarization block 11. A voltage comparator 13 compares an input signal "c" with a slice signal "j" for binarization. A binarized digital data "d" is output by a buffer 18. A top side envelope detection circuit 14 and a bottom side envelope detection circuit 15 detect top side voltage and bottom side voltage of the envelope of the input signal "c". Bandwidths of the detected voltages "k" and "l" are limited by low pass filters 16 to provide signals "m" and "n ". A voltage divider 17 outputs the middle voltage of the signals "m" and "n" as slice signal "j".

Figure 3:
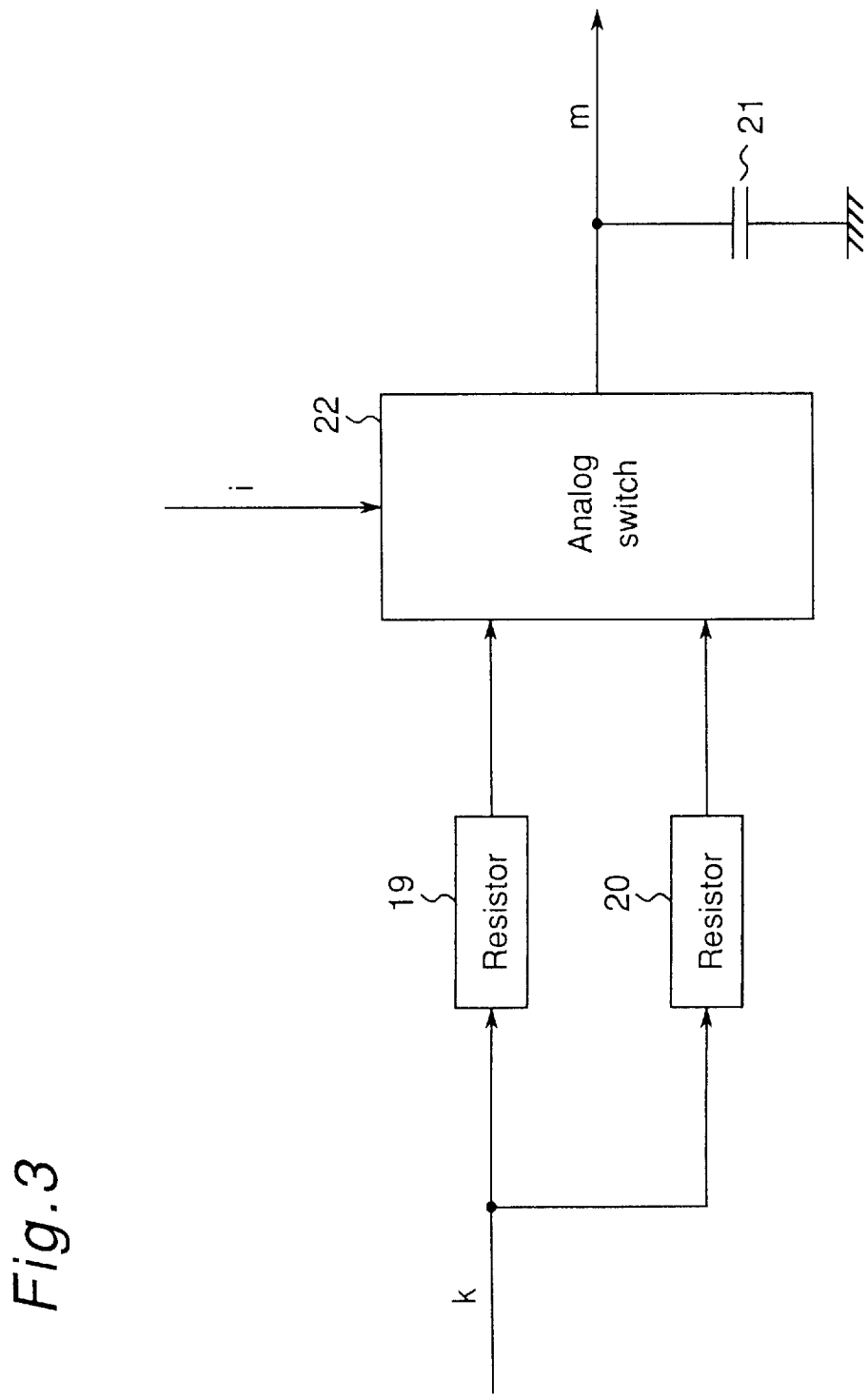
FIG. 3 is a diagram of a filter.

The low pass filters 16 are, for example, first-order low pass filters comprising a resistor and a capacitor. As shown in FIG. 3, the filter comprises a resistor 19, another resistor 20, a capacitor 21 and an analog switch 22. The resistor 19 or 20 is selected according to the control signal "j". Therefore, the limited frequency band of the output signal "m", "n" becomes different due to the resistance value of the resistor 19 or 20, and the frequency response of the slice signal "j" is changeable.

Figure 4:
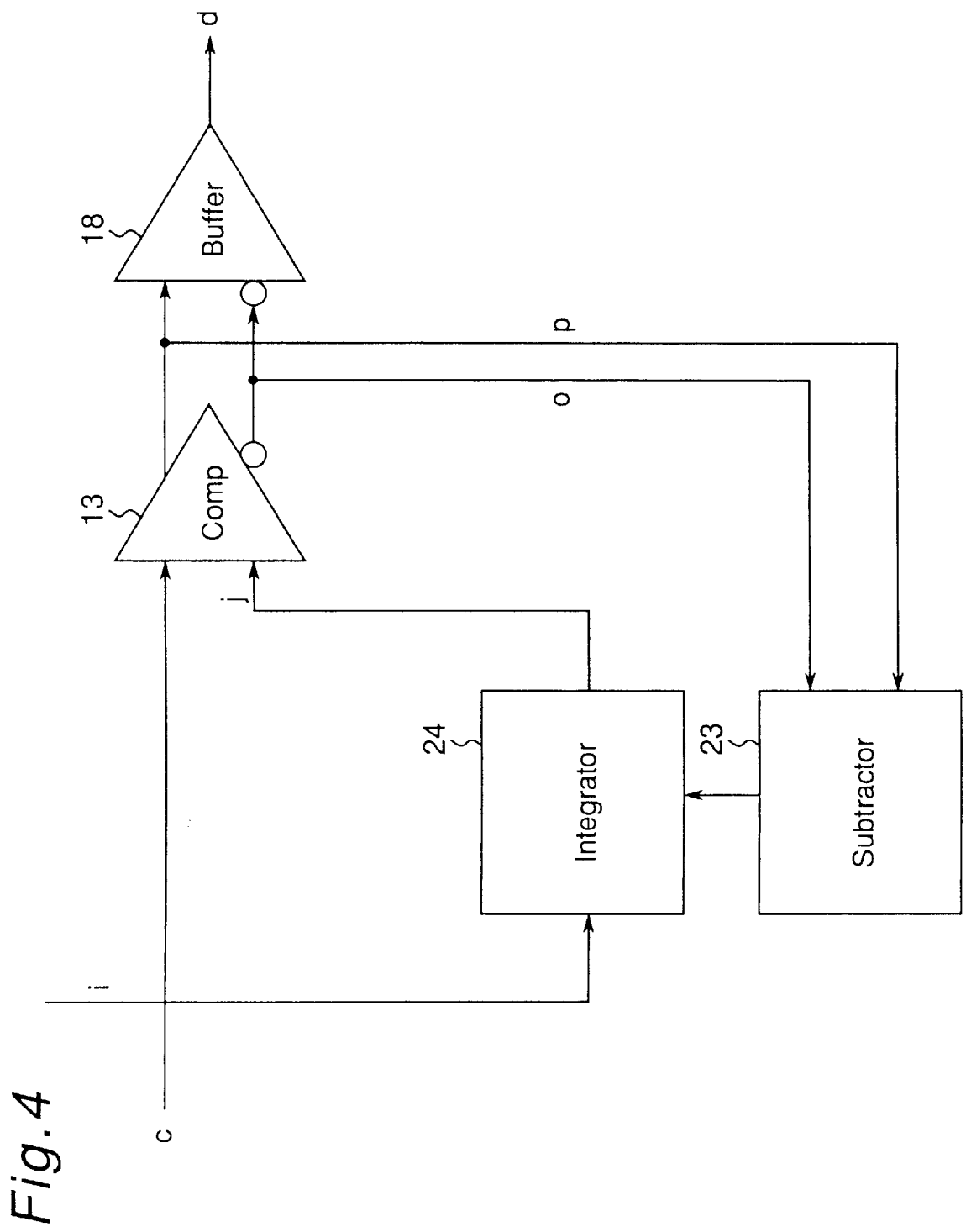
FIG. 4 is a block diagram of another binarization block.

FIG. 4 shows another block diagram of an example of the binarization block 11. A voltage comparator 13 compares an input signal "c" with slice signal "j" for binarization, and a buffer 18 outputs binarized data, as in the previous example. Further, the differential outputs of the voltage comparator 13 are subjected to subtraction by a subtracter 23. A difference output by the subtracter 23 is received by an integrator 24. An output of the integrator 24, or slice signal "j", is DSV of the binarized data. The integrator output is zero relative to the reference voltage when the number of data "1" is equal to that of data "0". However, the integrator output is fed back so that the reference voltage "j" is decreased to increase DSV if DSV<0 and is increased to decrease DSV if DSV >0.

Figure 5:
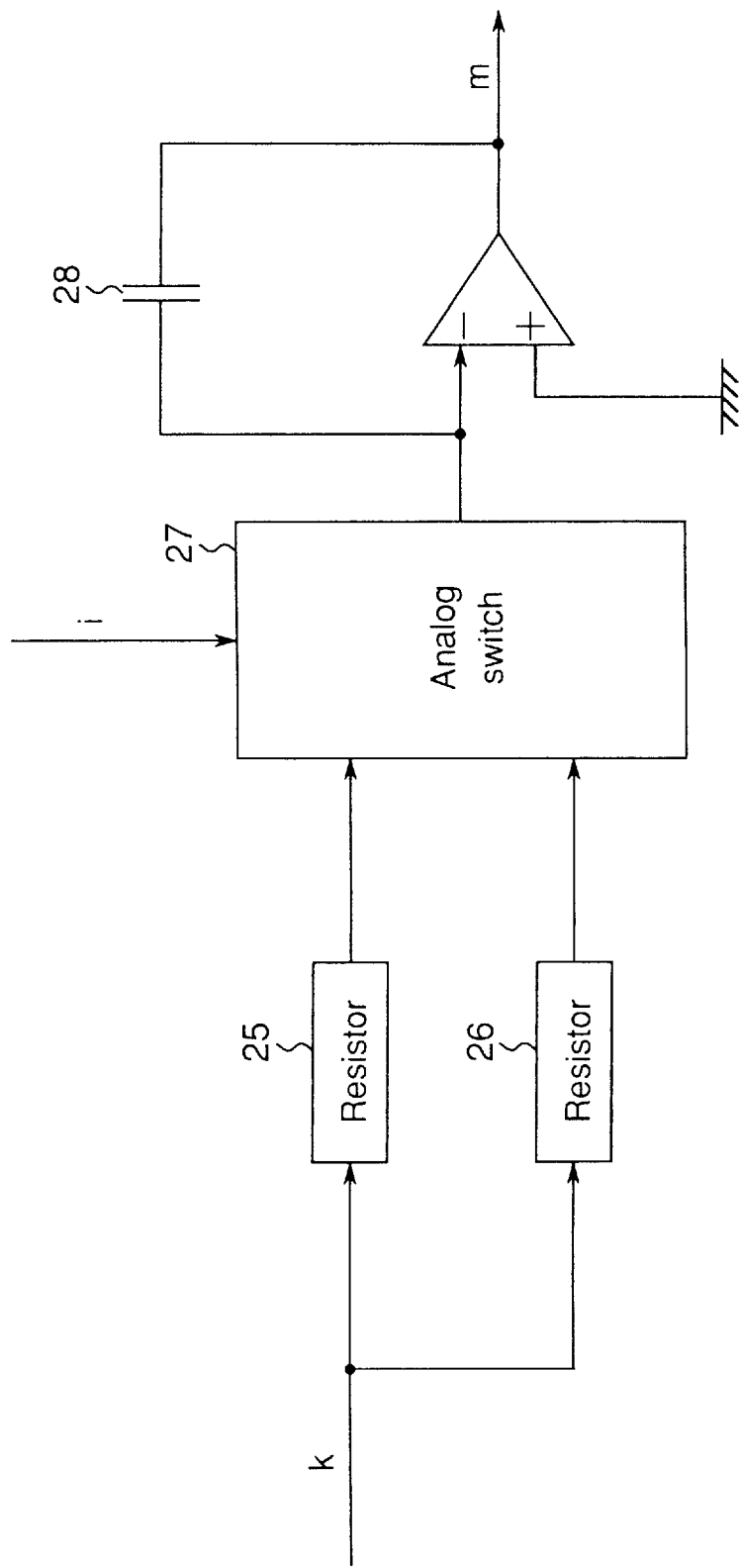
FIG. 5 is a diagram of an integrator.

FIG. 5 is a diagram of an example of the integrator 24. An analog switch 27 selects the resistor 25 or 26 according to the control signal "i". Therefore, two time constants determined by the resistor 25, 26 and the capacitor 28 can be selected, and the frequency response of the feedback loop is changeable.

Figure 6:
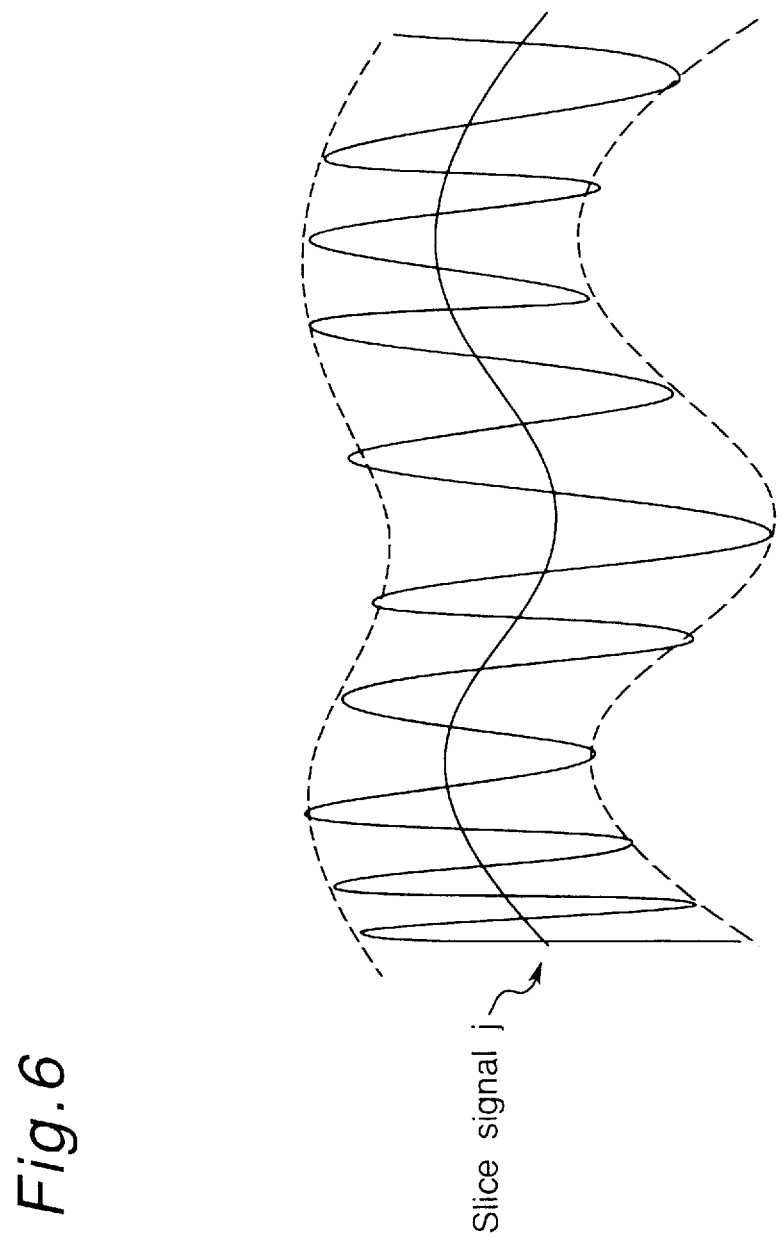
FIG. 6 is a diagram of reproduced signal and slice signal when envelope and amplitude of the signal varies.

FIG. 6 is a schematic diagram of a reproduced signal and a slice signal when the envelope and amplitude of the reproduced signal varies. Preferably, the slice signal "j" is always controlled so as to be located around the center of the envelopes (dashed lines) of reproduced signals in correspondence to the time variation of the envelope by the control of the slice signal.

Figure 7:
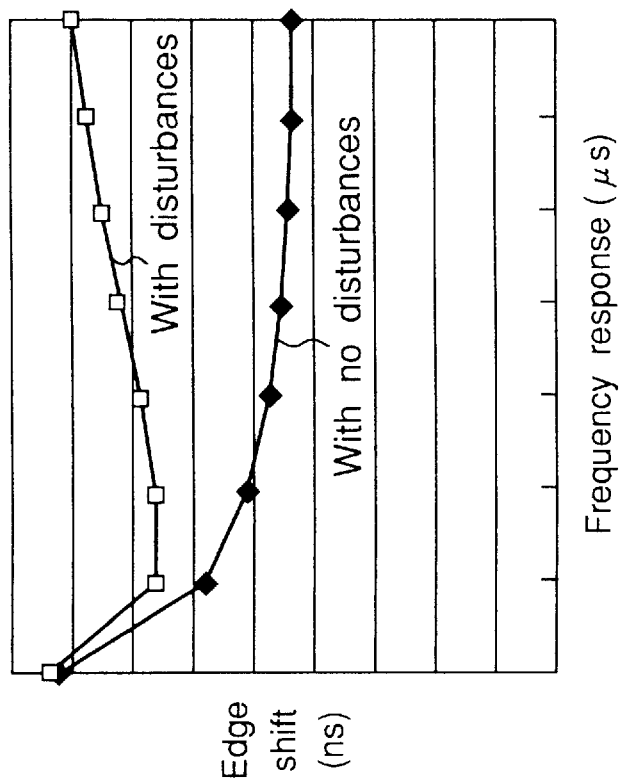
FIG. 7 is a diagram for illustrating edge shift when the reproduced signal is binarized with the slice signal.

FIG. 7 illustrates a graph of experimental data on edge shift when the reproduced signal is binarized with the slice signal. The abscissa represents a time constant of the frequency response of the slice signal, while the ordinate represents edge shift of the binarized data. When the envelopes have no external disturbances such as amplitude variation, the edge shift becomes smaller as the frequency response of the slice signal becomes slow or approaches a fixed value. On the other hand, when external disturbances are added to the reproduced signals, the edge shift is very large for the slice signal of a fixed value, decreases when the time constant of the frequency response increases and attains a minimum at a particular frequency response. The minimum of edge shift is about 10 kHz when linear velocity of the disk is 6 m/s and signals to be reproduced have a shortest bit length of 0.41 μm/bit under 8–16 modulation.

As shown in FIG. 8A, when the reproduced signal, represented as a curved solid line, is compared with a constant slice level, represented as a horizontal dashed line, there is no edge shift in the binarized signal shown at the lower side in FIG. 8A. On the other hand, as shown in FIG. 8B, when the frequency response of the slice signal is increased further, as represented as a curved dashed line, the edge shift increases irrespective of external disturbances in the reproduced signals, as shown at the lower side in FIG. 8B. The occurrence of edge shifts is ascribed to the response of the slice signal to the reproduced signal itself, and phase delay of the slice signal to the reproduced signal cannot be neglected.

Figure 9:
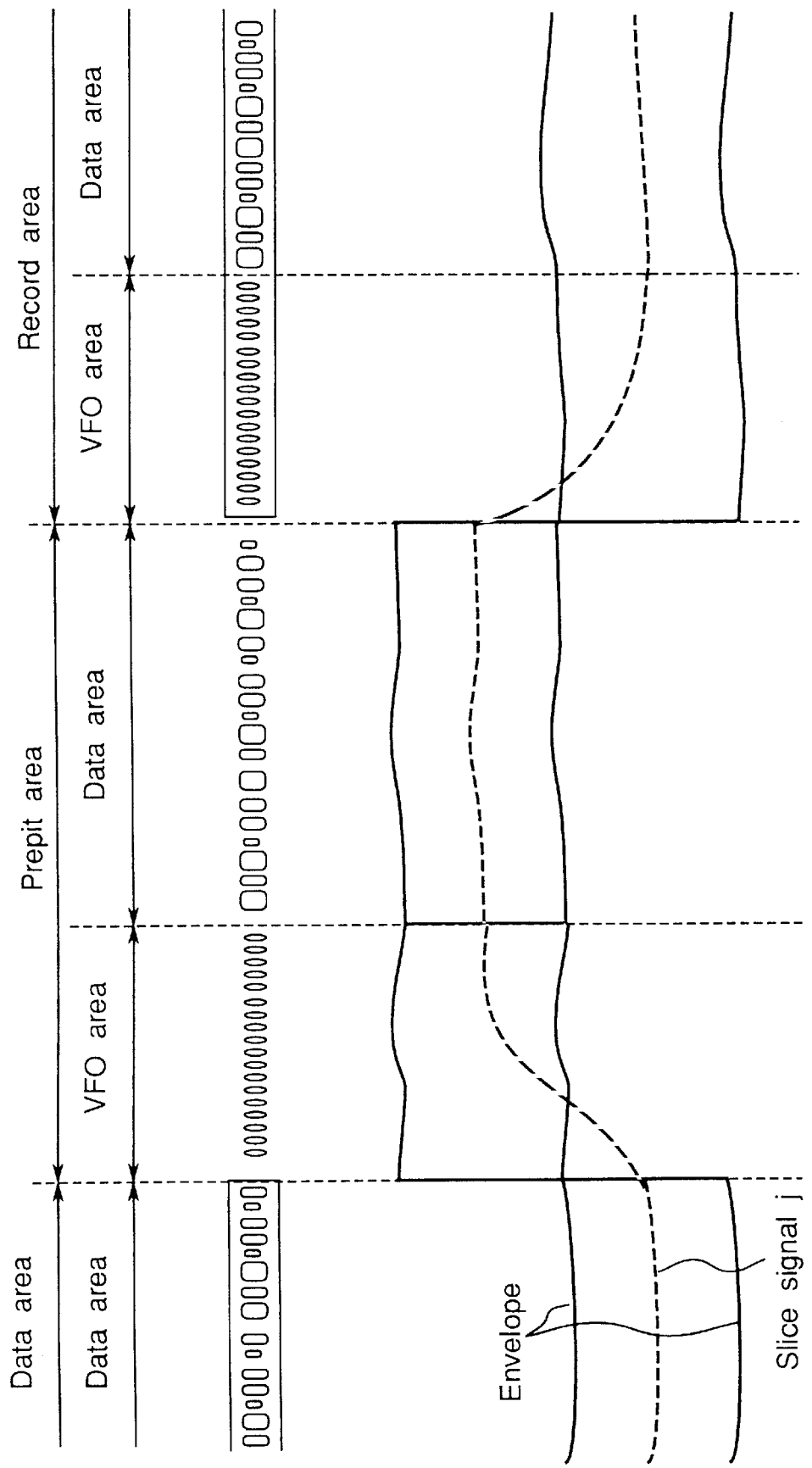
FIG. 9 is a diagram of a sector format and a reproduced signal.

FIG. 9 shows an example of sector format of an optical disk at the upper side. An example of a pattern recorded in a track is shown at the upper side in FIG. 9 with legends for classification of the pattern. In a prepit area, data are recorded as recesses in a disk mirror plane. In a record area, a groove, represented as an area encircled by a solid line, is formed in contrast to the mirror plane, and data are recorded in the bottom of the groove (land area). A record film is formed in the record area, and pits are formed by phase change phenomenon of the record film caused by a laser beam when data are recorded. However, the data recording process is not limited to phase transformation recording. Before the start of a data area in a prepit area or a record area, a VFO (Veriable Frequency Oscillator) area is provided for locking clock phase in the PLL block 12.

Envelopes of reproduced signal "c" are shown at the lower side in FIG. 9 when the pickup 3 reproduces, i.e., reads, the optical disk 1 having the above-mentioned sector format. The amplifier polarity is set to have a higher electric voltage as the reflectance increases. At the lower part in FIG. 9, a comparison example of frequency response is shown for the slice signal "j" which has the frequency response having the minimum edge shift of the binarized data as shown in FIG. 7. If the sector format shown in FIG. 9 is not sufficiently long for the slice signal "j", the slice signal "j" cannot respond appropriately at a discontinuous point of the intensity of reflected light from the disk such as a boundary between a mirror portion having prepits and a groove portion of a record area. Then, the position where the slice signal "j" converges to the middle point of the envelopes may exceed the VFO area. IF the binarized data is not reproduced correctly in the VFO area, phase locking by the PLL block of the reproduced data with reproduction clocks is not performed correctly. That is, correct data are not reproduced at the start of a data area. In order to solve this problem, the VFO area has to be provided sufficiently long for the slice signal to converge, and this decreases format efficiency.

Then, in the binarizing block 11, the frequency response determined as R1*C1 is set at the frequency for locking the slice signal at the start of a VFO area, and the frequency response determined as R2*C1 is set at the frequency at which the edge shift of binarized signals has a minimum (for example, 10 kHz in the above-mentioned data), where resistance of the resistor 19 is R1, the resistance of the resistor 20 is R2, the capacitance of and capacitor 21 is C1 in low pass filter 16 in the slice signal controller shown in FIG. 3. Naturally R1<R2 for the frequency control. By receiving a timing signal "i" generated by the control block 4 through the control line, the analog switch 22 selects R1 at the start of a VFO area and R2 at the second half of the VFO area and at the data area following the VFO area.

Figure 10:
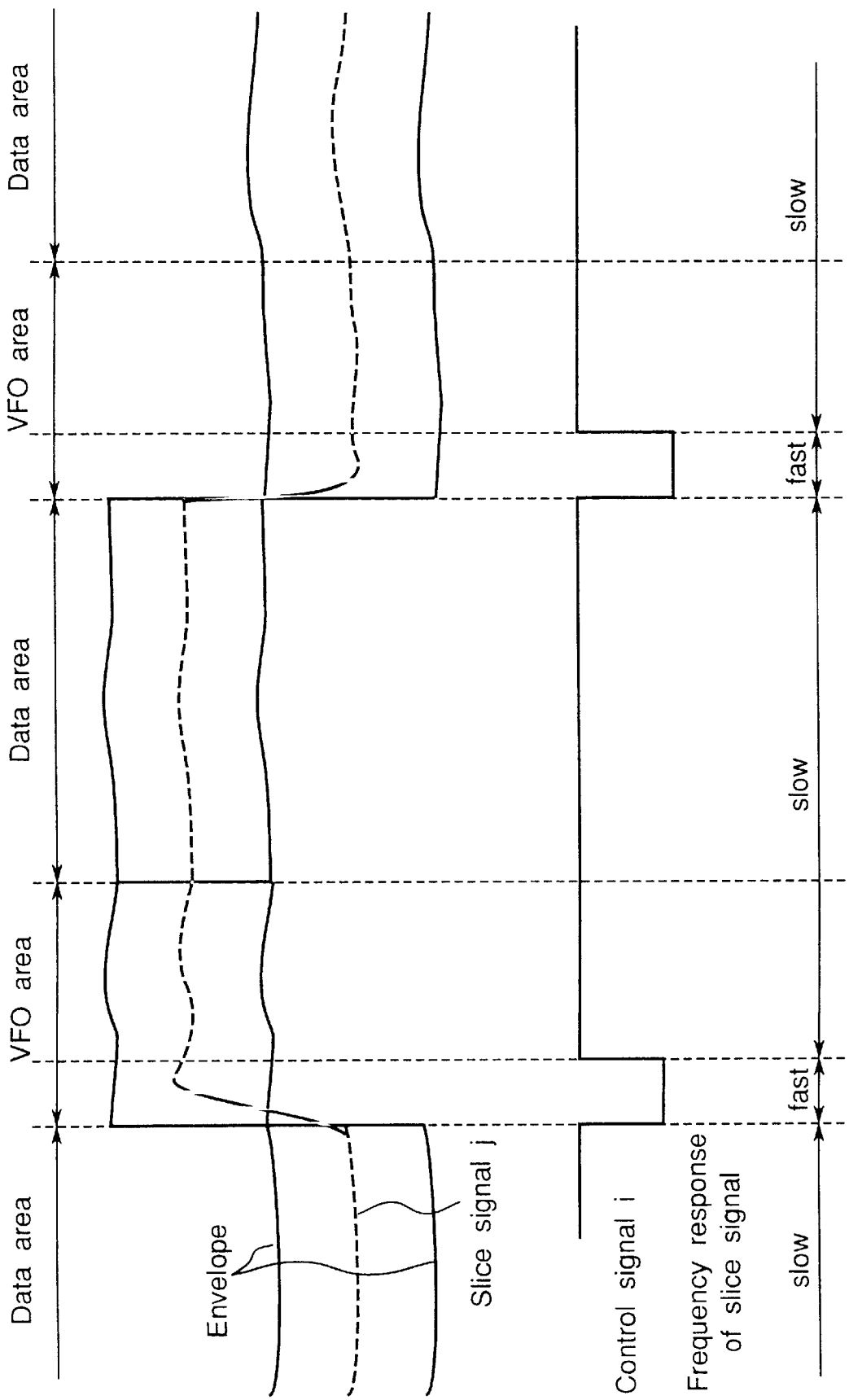
FIG. 10 is a timing chart of slice signal control.

FIG. 10 shows an example of the control of the frequency response of the slice signal. The terms "fast" and "slow" shown at the bottom in FIG. 10 show the speed of frequency response of slice signal. In this example, the control signal "i" is changed at the start of a VFO area in a prepit area or a record area, and the slice signal converges fast around the center of the envelopes in the VFO area. Then, the frequency response is changed to low frequency to suppress edge shift of binarized data to a small value by using the converged value as an initial value. Further, at the same time as the change of the frequency response of the slice signal or just thereafter, the locking of clock phase by the PLL block 12 is started. Then, when the phase of the clock signal is started to be compared with that of data, correct binarized data in the VFO area can be obtained, and phase locking is stabilized. Similarly, by using the integrator shown in FIG. 5 to control slice signal, the frequency response determined as R3*C2 or R4*C2 is set according to the control signal "i", where R3 denotes the resistance of the resistor 25, R4 denotes the resistance of the resistor 26, and C2 denotes the capacitance of the capacitor 28. Then, the response of the slice signal can be enhanced at the start of the VFO area, while the low speed frequency response can be set with the converged voltage as the initial value.

Figure 11:
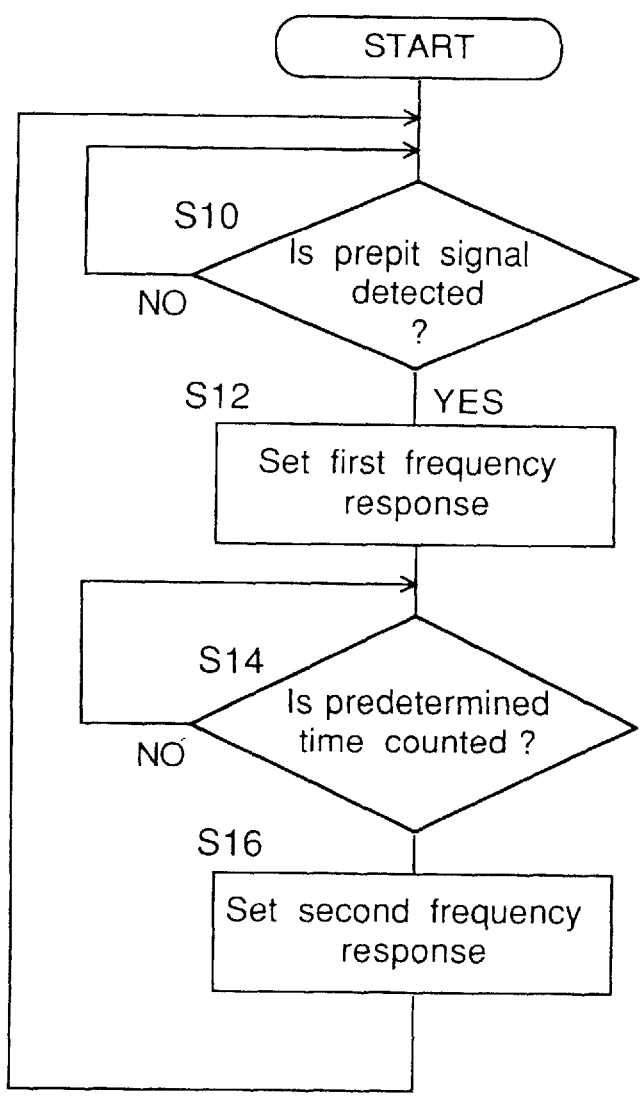
FIG. 11 is a flowchart of frequency response control by a controller.

FIG. 11 shows a flow of the above-mentioned frequency response control by the controller 4. When a discontinuity of signal is detected or a prepit signal is detected (YES at step S10), the first or fast frequency response is set (step S12). Then, when a predetermined time is counted (YES at step S14), the second or slow frequency response is set (step S16). Thus, the frequency response is changed four times in a sector. This control is repeated for each discontinuity of signals.

Figure 12:
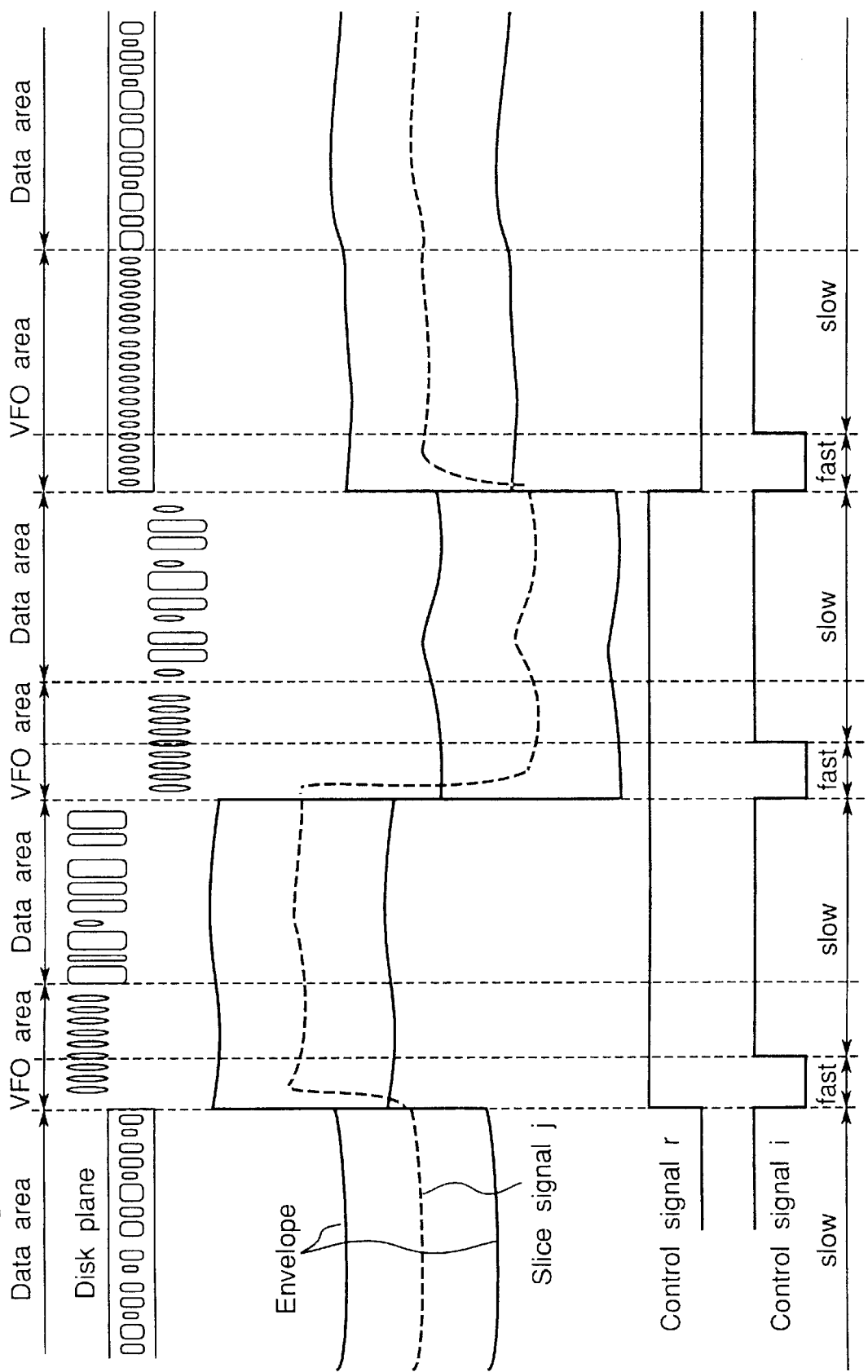
FIG. 12 is another timing chart of slice signal control.

FIG. 12 shows a sector format where prepit areas are formed with wobbling at the inward direction and at the outward direction of the optical disk by a half track relative to the track of a record area. The data pattern recorded in a prepit area in an optical disk shown in FIG. 12 is different from that shown in FIG. 9. A prepit area is divided into two parts each having a VFO area and a data area, and each part is wobbled by a half track from the center, and signals on the pits are reproduced with the laser beam in a state where the pits are offset by a half track. Then, the S/N ratio becomes larger by detecting a difference signal in tracking direction than by detecting a sum signal similarly to on-track reproduction.

Figure 13:
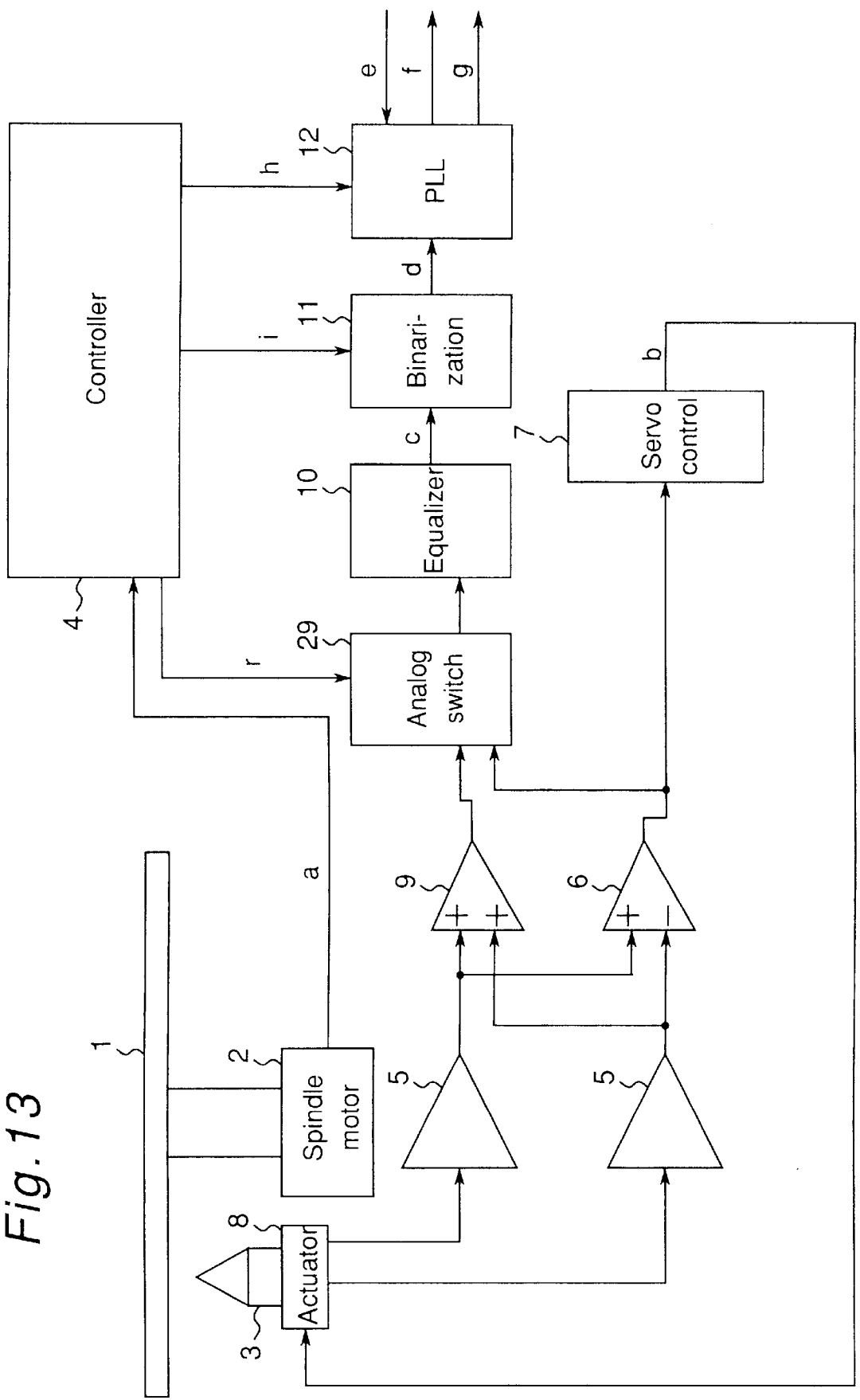
FIG. 13 is a block diagram of a different reproduction system for an optical disk.

FIG. 13 shows a different reproduction system for an optical disk 1 with wobbled prepit areas as shown in FIG. 12. In this system, an analog switch 29 sends either of output signals of the amplifiers 6 and 9 under the control of signal "r" from the controller 4. In the wobbled prepit area, the analog switch 29 sends a difference signal of the differential amplifier 6 according to the control signal "r" through an equalizer block 10 to a binarization block 11. In a record area following the prepit area, the analog switch 29 sends a sum signal from the preamplifier 9 normally.

As shown in FIG. 13, reproduced signals sent to the binarization block 11 have three discontinuous points. However, the frequency response of the slice signal is changed at each discontinuous point according to the control signal "i". The terms "fast" and "slow" shown at the bottom in Fig. 11 show the speed of the frequency response of the slice signal. Thus, the binarization is performed appropriately. The controller 4 changes the frequency response six times between fast and slow frequency responses in a sector by detecting discontinuous signals and using counters similarly to the flow shown in FIG. 11.

Figure 14:
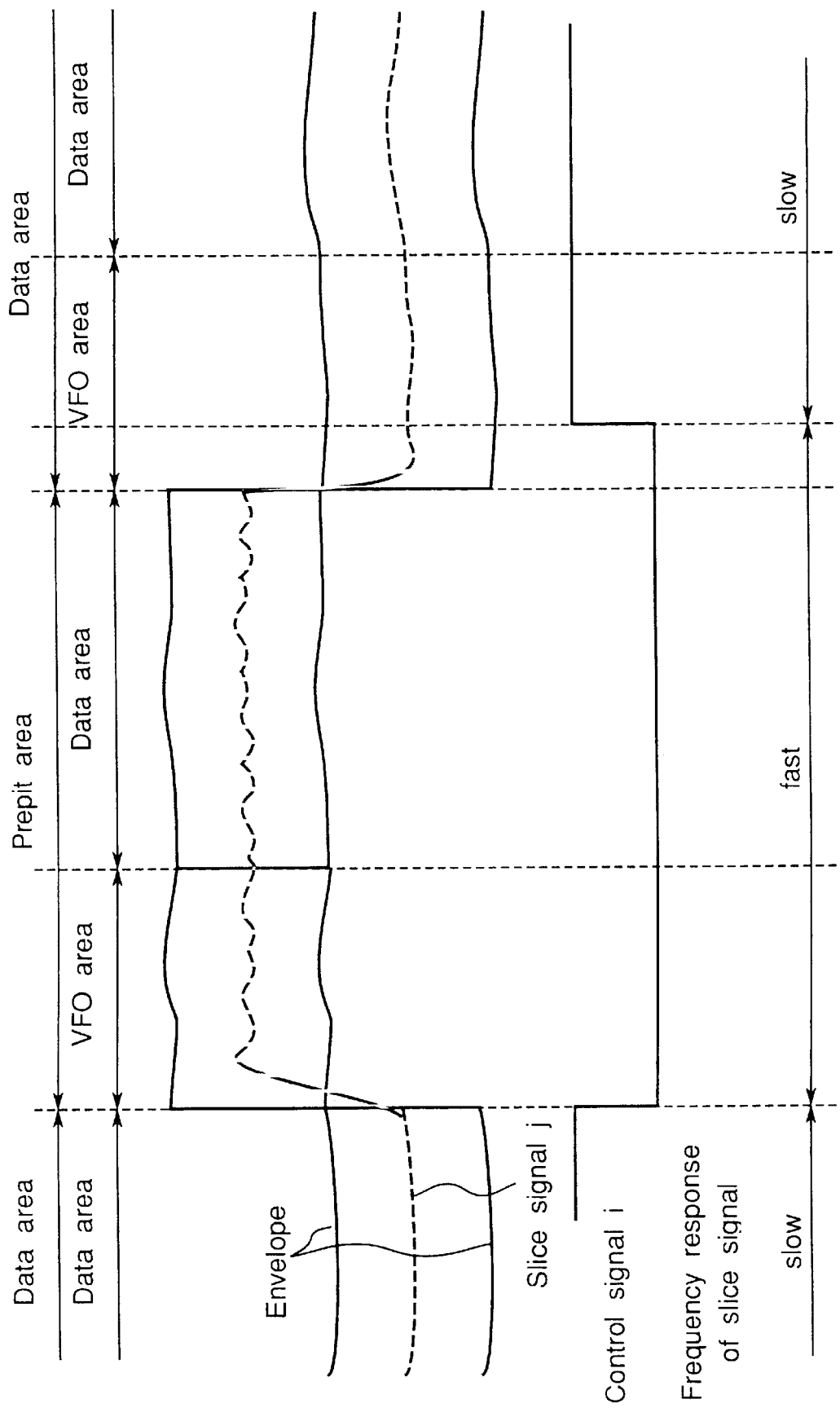
FIG. 14 is another timing chart of slice signal control.

FIG. 14 shows a modified case where the slice signal is subjected to fast speed frequency response in a prepit area and changed to slow speed frequency response in a record area. The terms "fast" and "slow" shown at the bottom in FIG. 14 show the speed of frequency response of slice signal. In a rewritable optical disk, disk address information and the like are recorded in a prepit area. The address information is essential for recording and reproducing information in an optical disk. Signals reproduced in a prepit area having prepits have a larger S/N ratio and a smaller distortion of signals than those reproduced in a record area having pits recorded with phase change. Therefore, reproduction in a prepit area is performed with fast speed frequency response of slice signal, while with slow speed frequency response in a record area. In the example shown in FIG. 14, the frequency response is made faster at the start of a prepit area. Then, after the slice level converges in a data area following the prepit area, the frequency response is made slower to the normal frequency response.

Next, data reproduction is described for a system where an optical disk is rotated with CLV (constant linear velocity) control. In the CLV control, when a pickup 3 seeks an outer track just after an inner track having a higher revolution number is reproduced, the revolution number is decreased to keep linear velocity constant. In this case, it takes an amount of time until the revolution number of the spindle motor is decreased to a predetermined value. However, if data can be reproduced until the revolution number of the spindle motor 2 is converged to a predetermined value, track access can be performed at a faster speed.

Figure 15:
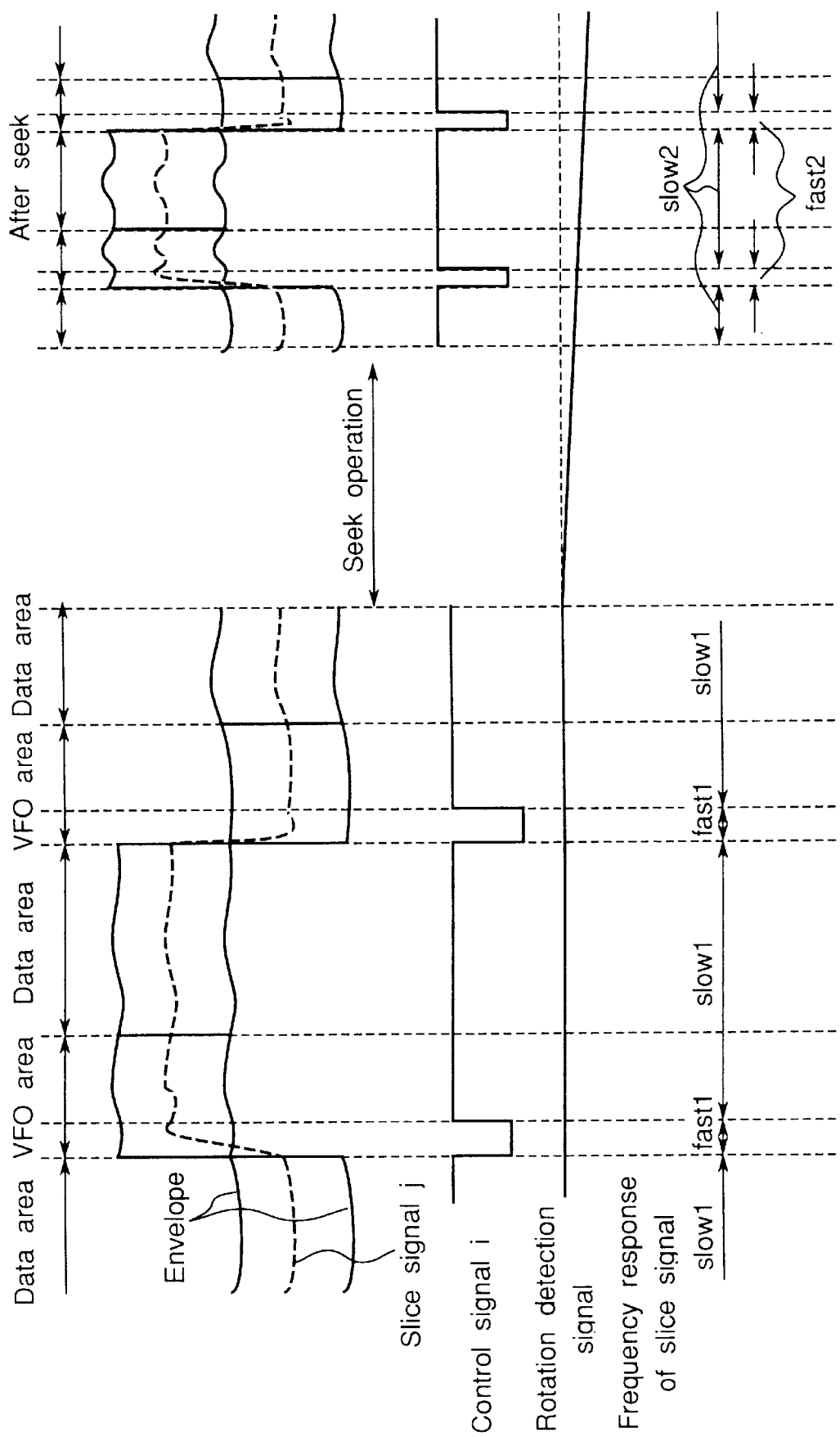
FIG. 15 is a further timing chart of slice signal control.

FIG. 15 shows a change in sector length when the optical head seeks the outermost track just after reproducing the innermost track. Just after the seek, the spindle motor 2 is rotated at about the revolution number for the innermost track, as shown in FIG. 15 for the rotation detection signal, and the sector length becomes shorter in time than the actual value. Therefore, the slice signal "j" may not converge sufficiently in the VFO area with the frequency response set for the normal disk rotation, and it has to be subjected to faster speed frequency response. Then, the change in frequency response is controlled by the control signal "i" by detecting the revolution number detection signal "a" of the spindle motor 2 by the control block 4. In FIG. 15, the terms "fast 1", "fast 2", "slow 1" and "slow 2" show the speed of frequency response of the slice signal, and the response speed is set so that "fast 1" > "fast 2" and "slow 1" > "slow 2". The slice signal controllers shown in FIGS. 3 and 5 are modified so that the analog switch 22, 27 changes four kinds of resistances in correspondence to control signal "1" for the frequency response.

On the other hand, when an inner track is reproduced just after an outer track, the frequency response of the slice signal has to be changed to a low speed response. The reason is that signals reproduced at a revolution number smaller than the normal one become longer in time, and the slice signal overresponds to the reproduced signals relative to the frequency response of normal rotation. Then, as shown in FIGS. 7 and 8, edge shift becomes larger.

Embodiments of the invention are described above, but the circuit for slice signal control is not limited to the examples shown in the embodiments.

As explained above, according to the invention, the slice signal follows external disturbances, such as amplitude and envelope variation of the reproduced signal of an optical disk or asymmetry of the reproduced signal, at an appropriate frequency response, and edge shift of binarized signals is minimized. Thus, sector format becomes efficient. Further, a suitable slice signal can be supplied when the rotation of the disk is changed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for use in reproducing information recorded in an optical disk, said method comprising:

reproducing information from the optical disk as an analog signal with a pickup, wherein the analog signal includes a discontinuity;

comparing the analog signal with a slice signal having a frequency response so as to generate a bi-level signal which has one of a high level and a low level at a given time;

feed-back controlling the slice signal continuously according to the generated bi-level signal; and changing the frequency response of the slice signal in correspondence to the discontinuity included in the analog signal.

2. A method as claimed in claim 1, further comprising:

generating an inverse signal which is inverse with respect to the bi-level signal;

wherein said feed-back controlling comprises producing a difference signal which represents a difference between the bi-level signal and the inverse signal, integrating the difference signal, and continuously controlling the slice signal, according to said integrating, so as to keep a number of occurrences of the high level in the bi-level signal equal to a number of occurrences of the low level in the bi-level signal.

3. A method as claimed in claim 1, wherein the optical disk has a sector format having a VFO area before a data area, said changing of the frequency response of the slice signal comprising:

changing the frequency response of the slice signal to a first frequency response for reproduction of information in a first region of the VFO area; and changing the frequency response of the slice signal to a second frequency response for reproduction of information in a second region of the VFO area, which follows the first region of the VFO area, and in the data area.

4. A method as claimed in claim 1, wherein the optical disk has a sector format having a prepit area and a record area, said changing of the frequency response of the slice signal comprising:

changing the frequency response of the slice signal to a first frequency response for reproduction of information in the prepit area and a first region in the record area; and changing the frequency response of the slice signal to a second frequency response for reproduction of information in a second region in the record area which follows the first region of the record area.

5. A method as claimed in claim 1, further comprising:

detecting a revolution number of the optical disk;

detecting a difference between the detected revolution number and a normal revolution number; and changing the frequency response of the slice signal according to the difference.

6. A method for reproducing information recorded in an optical disk, the optical disk having a record area and a prepit area having pits wobbled by a half track to an inward direction and to an outward direction of the disk, said method comprising the steps of:

reproducing information from the optical disk as an analog signal with a pickup, wherein the analog signal includes a discontinuity;

generating a difference signal, based on the analog signal, in a tracking direction in the prepit area;

generating a sum signal, based on the analog signal, in the tracking direction in the record area;

selecting one of the sum signal and the difference signal as a switch signal to be compared with a slice signal having a frequency response;

comparing the switch signal with the slice signal to generate binarized signals;

correcting the slice signal continuously based on the analog signal for external disturbances; and changing the frequency response of the slice signal in correspondence to the discontinuity included in the analog signal such that the frequency response of the slice signal is changed to a first frequency response for reproduction of information in a first region of the disk after the discontinuity in the analog signal and to a second frequency response, slower than the first frequency response, for reproduction of information in a second region following the first region.

7. A reproduction apparatus for use in reproducing information recorded in an optical disk, said apparatus comprising:

a pickup for reproducing information from the optical disk as an analog signal, wherein the analog signal includes a discontinuity;

a comparator for receiving the analog signal from said pickup and for binarizing the analog signal with a slice signal, having a slice signal level and a frequency response, so as to generate a bi-level signal which has one of a high level and a low level at a given time;

a feedback controller for controlling the slice signal level continuously according to the bi-level signal generated by said comparator and based on a time constant of said feed back controller; and a changer for changing the time constant of said feedback controller in correspondence to the discontinuity of the analog signal so as to change the frequency response of the slice signal.

8. A reproduction apparatus as claimed in claim 7, wherein said feedback controller comprises:

a subtractor for obtaining a difference between a number of occurrences of the high level in the bi-level signal generated by said comparator and a number of occurrences of the low level in the bi-level signal generated by said comparator and for generating a difference signal representative of the difference; and an integrator for integrating the difference signal generated by said subtractor, for generating an integrated difference signal representative of the integrating of the difference signal, and for supplying the integrated difference signal to said comparator as the slice signal.

9. A reproduction apparatus as claimed in claim 7, wherein said changer comprises:

a timing generator for generating a timing signal, which represents a time at which to change the frequency response of the slice signal with respect to the discontinuity of the analog signal; and a switch for changing the frequency response of the slice signal according to the timing signal generated by said timing generator.

10. A reproduction apparatus as claimed in claim 9, wherein the optical disk has a sector format having a VFO area before a data area, said changer is operable for changing the frequency response of the slice signal to a first frequency response for reproduction of information in a first region of the VFO area from a starting point of the VFO area and for changing the frequency response of the slice signal to a second frequency response, which is slower than the first frequency response, for reproduction of information in a second region of the VFO area, which follows the first region of the VFO area, and in the data area.

11. A reproduction apparatus as claimed in claim 9, wherein the optical disk has a sector format having a prepit area and a record area, said changer is operable for changing the frequency response of the slice signal to a first frequency response for reproduction of information in the prepit area and a first region in the record area and for changing the frequency response of the slice signal to a second frequency response for reproduction of information in a second region in the record area which follows the first region of the record area.

12. A reproduction apparatus as claimed in claim 7, wherein said changer comprises a detector for detecting a revolution number of the optical disk, and said changer is operable for detecting a difference between the detected revolution number and a normal revolution number and for changing the frequency response of the slice signal according to the difference.

13. A reproduction apparatus for use in the reproduction of information recorded in an optical disk having a sector format including a record area and a prepit area having pits wobbled by a half track to an inward direction and to an outward direction of the disk, said apparatus comprising:

a pickup for reproducing information from the optical disk as an analog signal, wherein the analog signal includes a discontinuity;

a subtractor for generating a difference signal, based on the analog signal, in a tracking direction in the prepit area;

an adder for generating a sum signal, based on the analog signal, in the tracking direction in the record area;

a switch for selecting, as a switch output signal, one of an output of said adder and an output of said subtractor;

a comparator for binarizing the switch output signal with a slice signal, having a frequency response, so as to generate a binarized signal;

a slice signal controller for continuously correcting the slice signal for external disturbances based on the analog signal reproduced by said pickup; and a changer for changing the frequency response of the slice signal in correspondence to the discontinuity in the analog signal, wherein said changer is operable for changing the frequency response of the slice signal to a first frequency response for reproduction of information in a first region of the disk after the discontinuity of the analog signal and for changing the frequency response of the slice signal to a second frequency response, slower than the first frequency response, for reproduction of information in a second region following the first region.

14. A reproduction apparatus as claimed in claim 13, wherein said changer comprises a timing generator for generating a timing signal, which represents a time at which to change the frequency response of the slice signal with respect to the discontinuity of the analog signal, and a switch for changing the frequency response of the slice signal according to the timing signal generated by said timing generator.

* * * * *